United States Patent [19]
Diedrich et al.

[11] Patent Number: 5,999,343
[45] Date of Patent: Dec. 7, 1999

[54] HOUSING FOR CRYSTAL ACCOMMODATED IN ITS INTERIOR WITH POLISHED OPTICAL END FACES

[75] Inventors: Frank Diedrich, Carmering; Thomas Engel, Munich; Jens Harnisch, Furstenfeldbruck; Mario Ledig, Gauting, all of Germany

[73] Assignee: Gsanger Optoelektronik GmbH, Munich, Germany

[21] Appl. No.: 09/124,109

[22] Filed: Jul. 29, 1998

[30] Foreign Application Priority Data

Jul. 29, 1997 [DE] Germany ............... 197 32 666

[51] Int. Cl.$^6$ .................................................. G02B 7/02
[52] U.S. Cl. .................... 359/819; 359/894; 359/507; 359/513
[58] Field of Search ........................ 359/818, 819, 359/820, 894, 507, 512, 513

[56] References Cited

U.S. PATENT DOCUMENTS

| | | |
|---|---|---|
| 4,850,674 | 7/1989 | Hasselskog ............... 359/820 |
| 4,961,627 | 10/1990 | Swain et al. ............... 359/894 |
| 5,062,706 | 11/1991 | Magnussen, Jr. ............... 359/894 |
| 5,223,986 | 6/1993 | Mayerjak et al. ............... 359/894 |
| 5,243,929 | 9/1993 | Brown et al. ............... 359/894 |
| 5,459,609 | 10/1995 | Schrag ............... 359/894 |

*Primary Examiner*—Loha Ben
*Attorney, Agent, or Firm*—Antonelli, Terry, Stout & Kraus, LLP

[57] ABSTRACT

The invention relates to a housing for a water-soluble crystal to be placed in its interior, with polished optical end faces, especially for nonlinear frequency conversion in laser applications, with a jacket housing for receiving and holding the crystal at its jacket, leaving these end faces free, and with housing lids sealing off the two end jacket openings of the housing in a gastight manner, the lids both being secured in a releasable fashion to the jacket housing, with an optically transparent window in the form of a disk being located between each housing lid and the jacket housing, the disk sealing off the interior by means of an O-ring. Each housing lid has an inwardly projecting projection at its lid edge, the projection engaging an outwardly open groove to form a latching connection.

14 Claims, 1 Drawing Sheet

HOUSING FOR CRYSTAL ACCOMMODATED IN ITS INTERIOR WITH POLISHED OPTICAL END FACES

BACKGROUND OF THE INVENTION

The invention relates to a housing for a crystal accommodated in its interior with polished optical end faces especially for nonlinear frequency conversion in laser applications.

Usually such known housings are provided with windows that are pressed against the jacket housing on the inside by means of a surrounding seal, for example an O-ring, with the housing lids being screwed into the ends of the jacket housing by means of screws so that the windows, clamped firmly by the housing lids, press the O-rings against the jacket housing on the inside. In addition, the crystal is placed in a module in the shape of a circular cylinder or in its cylindrical chamber that extends concentrically with respect to the axis of the cylinder, and is glued there for example. The module is secured in the jacket housing by means of a lateral screw.

The disadvantage of this known housing is the fact that the O-ring is mechanically pretensioned by means of the screw which is both costly and also requires assembly time. Moreover, a larger structural size is required since the screws must always be located outside the useful window surface next to the jacket openings, so that the space required for the thread and the head of the screw must basically be added to the usable diameter.

When the screws for the O-ring are tightened, there is also the risk that if slippage occurs, the outside of the optical window will be damaged. Finally, tightening the module to the jacket housing with the screws can cause leaks, which is undesirable.

The known housings are costly to make mechanically and to install, and many individual parts are required so that there is a danger of dust penetrating the interior of the housing. When the screws are tightened to secure the module, there is also the danger that the optical end faces of the crystal themselves will be damaged. Moreover, this assembly activity is especially risky since because of the sensitivity of the crystal to water, it must generally be handed with gloves in order to prevent moisture on the hands from coming in contact with the crystal.

In general, a housing according to the art is costly to manufacture and costly to install.

SUMMARY OF THE INVENTION

The goal of the invention is to design a housing that has fewer parts inside the housing and is easier to mount.

This goal is achieved in a housing for a crystal accommodated in its interior with polished optical end faces, especially for nonlinear frequency conversion in laser applications. The housing includes a jacket housing for accepting and retaining the crystal leaving its end faces open and with housing lids sealing off the two end jacket openings of the housing in a gastight manner, the lids both being retained on the jacket housing. An optically transparent window in the form of a disk is located between each housing lid and jacket housing, the disk sealing off the interior by means of a circumferential seal, for example an O-ring. Each housing lid has an inwardly projecting projection at its lid edge, the projection engaging an outwardly open groove to form a latching connection.

Hence, an important aspect of the invention is the snap connection between each housing lid and the jacket housing so that not only is the lid secured to the housing but the window and the O-ring are pressed tightly against the jacket housing.

In addition, the conduction of heat from the outside of the housing to the crystal takes place exclusively through the housing that is preferably made of aluminum, a very good conductor of heat. The housing is compact and can be manufactured economically and is also both simple and safe to mount. No sharp-edged tools such as screwdrivers are used to mount it so that the danger of damaging the window or the optical surfaces does not exist.

Further advantages of the design according to the invention follow from the protection of the crystal, especially the polished optical end faces, against moisture, breakage, and scratches. In addition, the surface is designed so that it can be irradiated with a laser beam diameter that is as large as possible. No materials are inside the housing that could release gas, especially from adhesives, that could precipitate on the optically polished end faces. Assurance is also provided that the laser radiation, apart from the transparent volume of the crystal, does not reach any parts inside the housing. Finally, opening of the housing by unauthorized persons is at least made more difficult. Good heat transmission from the outside through the housing to the crystal and hence an effective temperature stabilization of the crystal with high control amplification can be ensured. Finally, eliminating screws to press the O-ring means that the outside diameter can be kept smaller and the risk of damaging the windows with screwdrivers is eliminated, and the elimination of screws to clamp the crystal rules out the chance of damaging the crystal itself. However, although simple and rapid assembly is made possible, the sensitive crystal can be mounted immediately after polishing, in other words directly at the polishing location, in the housing according to the invention so that as a result the sensitive optical end faces are protected as soon as possible.

BRIEF DESCRIPTION OF THE DRAWINGS

An embodiment of the invention will now be described in greater detail with reference to the drawing.

DETAILED DESCRIPTION OF THE PREFERRED EMBODIMENTS

Figure 2:
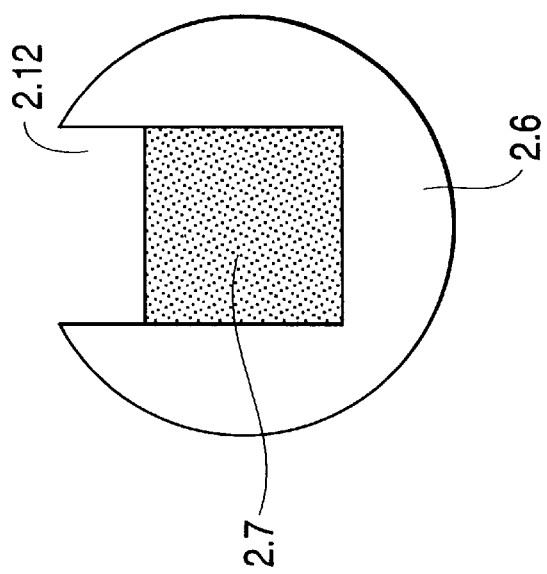
FIG. 2 is a detail according to FIG. 1 in cross section.

The housing has a jacket housing 2.1 designed as a hollow cylindrical circular cylinder in whose interior the water-soluble crystal, designated as a whole by 2.7, is located in a module 2.6 (FIG. 2). At the two end jacket openings, annular perforated disks 2.9 are located as aperture limiters on both sides of module 2.6, said disks preferably consisting of polytetrafluoroethylene.

In addition, an O-ring 2.5 is supported at an inner shoulder 2.10 at one side in the jacket housing on each side of the jacket opening, said ring abutting with its other side a window designed as an optically transparent window 2.4. The window is provided on its exterior with a shim washer 2.3 designed as a plain washer which is located between disk 2.4 and the housing lid 2.2 that rests on the end jacket opening of jacket housing 2.1 and transmits the force from the latter to act on the O-ring.

Housing lid 2.2 has an inwardly projecting projection 2.13 on its lid edge, said projection engaging an externally open groove 2.14 of jacket housing 2.1 to form a latching connection. Both groove 2.14 and inwardly projecting projection 2.13 are designed to be circumferential and circular in cross section. Each groove 2.14 of jacket housing 2.1 is adjacent to a push-on ramp for projection 2.13 that tapers toward the adjacent jacket opening, said ramp being designed as the frustrum of a cone. Thus in a simple fashion the housing can be mounted without a tool and can compress O-ring 2.5 with a sealing action and, with suitable dimensioning of groove 2.14 and the back end of projection 2.13, can also be designed so that it can be lifted off by means of a tool.

Figure 1:
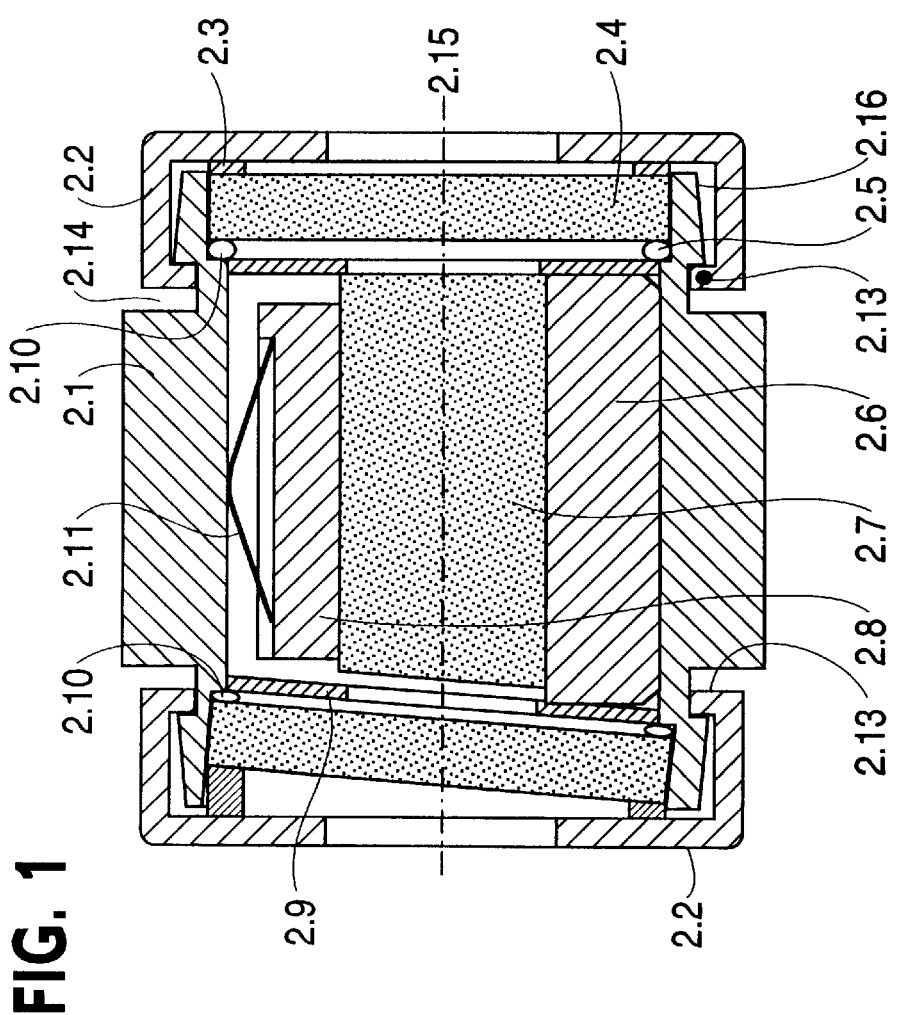
FIG. 1 is a schematic lengthwise section through the housing.

A window is located on the left side in FIG. 1 that is tilted relative to axis 2.15 of jacket housing 2.1, said window being necessary and advantageous for several embodiments. For this purpose, wedge-shaped shim washers 2.3 are applied to the interior of housing lid 2.2. In addition, receiving areas for the window and the annular perforated disk must be provided at an appropriate angle in the interior and/or in the vicinity of the inner jacket opening of jacket housing 2.1.

Finally, crystal 2.7 as shown in FIG. 2 is located in a module 2.6 designed as a vertical cylinder and has a crystal recess 2.12 that extends in the direction of axis 2.15 of the cylinder, said recess being essentially rectangular in cross section. Crystal 2.7, which is approximately square in cross section, is inserted from one jacket side into this recess. Then, in the mounted state, a support 2.8 can be provided on crystal 2.7 which is held by a clamping spring 2.11 against the interior of jacket housing 2.1. This ensures a safe mounting for crystal 2.7.

We claim:

1. Housing for a crystal (2.7) accommodated in its interior with polished optical end faces, especially for nonlinear frequency conversion in laser applications, said housing having a jacket housing (2.1) for accepting and retaining said crystal (2.7) at its jacket, leaving its end faces open, and having housing lids (2.2) sealing off two end jacket openings of the housing in a gastight manner, said lids both being retained on said jacket housing (2.1), and further having an optically transparent window (2.4) in the form of a disk being located between each housing lid (2.2) and said jacket housing (2.1), said disk sealing off the interior by means of a circumferential seal, said seal being an O-ring (2.5), characterized in that each housing lid (2.2) has an inwardly projecting projection (2.13) at its lid edge, said projection engaging an outwardly open groove (2.14) of the jacket housing to form a latching connection.

2. Housing according to claim 1, characterized in that each groove (2.14) of said jacket housing (2.1) is designed so that it surrounds the jacket opening.

3. Housing according to claim 1, characterized in that the projection (2.13) of said housing lid (2.2) is designed to be circumferential.

4. Housing according to claim 1, characterized in that each groove (2.14) and each projection (2.13) are designed to be circular and circumferential.

5. Housing according to claim 1, characterized in that a push-on ramp (2.16) for the projection (2.13) that tapers in the direction of adjacent jacket opening abuts each groove (2.14) of the jacket housing (2.1).

6. Housing according to claim 5, characterized in that the push-on ramp (2.16) is designed as a frustrum of a cone.

7. Housing according to claim 1, with the crystal to be placed in the interior being releasably held in a module (2.6) to be secured to the jacket housing (2.1), and with the module (2.6) being designed as a perpendicular cylinder, characterized in that the module (2.6) has a crystal recess (2.12) that interrupts its jacket and extends in the direction of axis (2.15) of the cylinder.

8. Housing according to claim 7, characterized in that the module (2.6) is designed as a perpendicular circular cylinder.

9. Housing according to claim 7, characterized in that the recess (2.12) is designed to be essentially rectangular in cross section.

10. Housing according to claim 7, characterized in that a support (2.8) for a clamping spring (2.11) that abuts the interior of the jacket housing (2.1) is insertable into the recess (2.12).

11. Housing according to claim 7, characterized in that annular perforated disks (2.9) are provided that can be pressed by O-rings (2.5) as aperture limiters on both sides of the module (2.6).

12. Housing according to claim 11, characterized in that the annular perforated disks (2.9) contain polytetrafluoroethylene.

13. Housing according to claim 8, characterized in that at least one window is located between a shim washer (2.3) that is wedge-shaped in a side view and the circumferential seal so that axis (2.15) of the cylindrical module (2.6) and the normal to a surface of the at least one window form an angle between them.

14. Housing according to claim 13, characterized in that the angle is 0.5 to 5°.

* * * * *